United States Patent
Hara

(12) 
(10) Patent No.: US 6,282,302 B1
(45) Date of Patent: Aug. 28, 2001

(54) FINGERPRINT IMAGE CUTOUT PROCESSING DEVICE FOR TENPRINT CARD

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/339,731

(22) Filed: Nov. 14, 1994

(30) Foreign Application Priority Data

Nov. 12, 1993 (JP) .................................................... 5-282887

(51) Int. Cl.⁷ ........................................................ G06K 9/00
(52) U.S. Cl. .......................... 382/116; 382/116; 382/119; 382/124; 382/125
(58) Field of Search .................................. 345/112, 118, 345/121, 126, 146, 163, 179; 354/76; 355/20, 40, 45; 356/71; 358/448, 527, 530, 537, 538; 364/468, 480, 488, 489; 382/116, 119, 124, 125, 127, 177, 276, 282, 283, 287, 289, 290, 291, 296; 395/119, 120, 133, 136, 137, 138, 155, 157, 161; 462/1, 3; 396/15; 902/1, 3; 283/68

(56) References Cited

U.S. PATENT DOCUMENTS

| | | | | |
|---|---|---|---|---|
| 3,704,949 | * | 12/1972 | Thomas | 356/71 |
| 4,533,959 | * | 8/1985 | Sakurai | 382/289 |
| 4,603,966 | * | 8/1986 | Brownstein | 355/45 |
| 4,607,384 | * | 8/1986 | Brooks | 382/124 |
| 4,616,926 | * | 10/1986 | DiPietro et al. | 355/45 |
| 4,694,354 | * | 9/1987 | Tanaka | 358/296 |
| 4,721,628 | * | 1/1988 | Pieper | 427/1 |
| 4,775,886 | * | 10/1988 | Hirosawa | 358/537 |
| 4,817,183 | * | 3/1989 | Sparrow | 382/125 |
| 4,922,543 | * | 5/1990 | Ahlbom | 382/291 |
| 4,982,437 | * | 1/1991 | Loriot | 382/282 |
| 5,040,224 | * | 8/1991 | Hara | 382/124 |
| 5,048,099 | * | 9/1991 | Lee | 382/282 |
| 5,093,653 | * | 3/1992 | Ikehira | 345/126 |
| 5,363,453 | * | 11/1994 | Gagune | 382/125 |

* cited by examiner

Primary Examiner—Jayanti K. Patel
(74) Attorney, Agent, or Firm—Sughrue, Mion, Zinn, Macpeak & Seas, PLLC

(57) ABSTRACT

A fingerprint image cutout processing device for a tenprint card includes a tenprint card image input unit for inputting, on a card basis, image data of a tenprint card in which rolled fingerprints and plain fingerprints of ten fingers of each hand are printed, an image storage unit for storing image data of the tenprint card input by said tenprint card image input unit, cutout information input portion for displaying the tenprint card images and ten cutout frames for specifying a cutout range of a fingerprint image of each finger to be superposed with each other and receiving input of fingerprint cutout information of each finger, and a cutout and edit portion for cutting and editing fingerprint image data of each finger out of the image data of the tenprint card stored in the image storage unit and displaying the edited data based on the input cutout information.

26 Claims, 10 Drawing Sheets

FINGERPRINT IMAGE CUTOUT PROCESSING DEVICE FOR TENPRINT CARD

BACKGROUND OF THE INVENTION

1. Field of the Invention

The present invention relates to a tenprint card reader for use in inputting fingerprint images printed on a tenprint card to a computerized fingerprint collation system.

1. Description of the Related Art

In general, collation of fingerprint images by a computerized fingerprint collation system is carried out by inputting and processing each individual's ten fingerprint images printed on a tenprint card one fingerprint at a time.

A common tenprint card, on which fingerprints are printed, is approximately 20 centimeters square in area. The tenprint card is typically composed of a rolled fingerprint section on which a rolled fingerprint of each finger is to be printed and a plain fingerprint section on which a plain fingerprint of each finger is to be printed. Herein, the rolled fingerprint represents a print taken of a rolling finger and the plain fingerprint represent a print of a finger taken without rolling.

The rolled fingerprint section is made up of ten corresponding to the individual's ten fingers, each having an area of some 4 centimeters square. The plain fingerprint section is made up of a thumb region on which a plain fingerprint of the thumb is to be printed, and a four-finger region on which plain fingerprints of four fingers, the forefinger, the middle finger, the ring finger and the little finger, are printed all together. The tenprint card is capable of containing fingerprints of a total of 20 fingers in the above-described respective regions. The size and the position of the respective regions of the rolled fingerprint section and the plain fingerprint section may slightly vary with the kind of tenprint card.

During fingerprint image collation by a computerized fingerprint collation system, an image within an area approximately 2.6 centimeters square is first cut out of a fingerprint image of each finger printed on the above-described tenprint card. The image includes a core of the fingerprint. The subsequent collation processing is economically carried out with respect to the fingerprint image data contained within this cutout range.

A fingerprint image cutout processing device is used for cutting and sequentially inputting fingerprint images of ten fingers to be collated out of the tenprint card.

A conventional fingerprint image cutout processing device for a tenprint card cuts out rolled fingerprints of the tenprint card within the above-described cutout range and inputs the cut-out fingerprint images to a fingerprint collation system one fingerprint at a time. The fingerprint image cutout area of each finger is determined prior to fingerprint image collection by inputting numerical location data of each rolled fingerprint section on the type of tenprint card to be used. In other words, by adjusting a scan area for reading each fingerprint image based on the given location information, the conventional device cuts out and sequentially inputs a fingerprint image within the area of a square having one side parallel to a scan line.

However, it is more difficult to use fingerprint cards which have rolled fingerprint sections at different locations or the cards to change a cutout position of cards which have a rolled fingerprint section at the same location. A conventional tenprint card reader for use with the above-described fingerprint image cutout processing device will then require input of location information as numerical data before reading each of the cards. This requires more processes and time for the numerical location data acquisition and verification of input results.

When the conventional device scans a plurality of tenprint cards each having a rolled fingerprint section at the same location, the conventional device automatically cuts out fingerprints according to the same cutout position designation. Nevertheless, the cutout area tend to have partially missing fingerprints when the fingerprints are displaced toward the edge of a square region of some 4 centimeters square.

In a case where a rolled fingerprint is of poor quality and the corresponding plain fingerprint is of high quality, collation accuracy can be improved by cutting out the plain fingerprint. However, the conventional device does not provide the opportunity to change a selected position of the cutout area.

With a skewed fingerprint in a fingerprint registration region of the rolled fingerprint section, it is impossible for the conventional device to cut out the fingerprint by rectifying the direction of its fingertip.

Another conventional fingerprint image input device for use with the above-described fingerprint cutout processing device is a oneprint image input device which inputs fingerprint images one fingerprint at a time. When inputting fingerprint images from a tenprint card using the oneprint image input device, an operator shifts the tenprint card for each finger and adjusts the area of the fingerprint image to be cut out to a scan position of the device. With the oneprint image input device, it is possible to overcome the above-described shortcomings of the conventional fingerprint image cutout processing device for a tenprint card.

During fingerprint image input by the oneprint image input device, however, the tenprint card should be manually shifted to ensure an optimum scan position every time an image is to be input for each finger. This operation is time-consuming and a burden on an operator.

SUMMARY OF THE INVENTION

A first object of the present invention is to provide a fingerprint image cutout processing device for a tenprint card capable of selecting and inputting a given fingerprint image on the tenprint card with ease, thereby reducing the time and number of processes necessary for fingerprint image input while enabling improvement in the accuracy of fingerprint collation processing in a fingerprint collation system.

A second object of the present invention is to provide a fingerprint image cutout processing device for a tenprint card capable of displaying a center of cropping region and allowing an operator to move the center of the cropping region within a core area of a fingerprint image thereby further reducing the time and number of processes necessary for fingerprint image input while facilitating fingerprint collation processing in a fingerprint collation system.

A third object of the present invention is to provide a fingerprint image cutout processing device for a tenprint card capable of allowing an operator to specify a cutout position and a cutout direction for images, thereby providing a device capable of cutting fingerprints printed aslant in a fingerprint section of a tenprint card with the directions of their fingertips aligned with each other.

According to one aspect of the invention, a fingerprint image cutout processing device for a tenprint card comprising:

image input means for inputting, on a card basis, image data of a tenprint card containing rolled fingerprints and plain fingerprints of ten fingers;

image storage means for storing image data of the tenprint card input by said image input means;

cutout information input means for displaying tenprint card images and ten cutout frames for specifying a cutout area for each fingerprint image to be superposed with each other and accepting an operator input of fingerprint cutout information for each finger; and cutout means for cutting, on a finger-by-finger basis, fingerprint image data out of the image data of the tenprint card stored in said image storage means based on the cutout information input to said cutout information input means.

In the preferred construction, the fingerprint image cutout processing device for a tenprint card further comprises display means for displaying fingerprint images, wherein said cutout means displays the fingerprint image data cut out one image at a time, in a predetermined order on a screen of said display means.

In the preferred construction, the cutout information input means displays a cutout frame of a quadrangular shape corresponding to the size of a fingerprint image of the tenprint card to be superposed on an arbitrary position on a tenprint card image.

In a preferred construction, the cutout information input means comprises:

means for displaying tenprint card images;

means for displaying a cutout frame to be superposed on said tenprint card images; and means for determining a position of said cutout frame.

Also, the cutout information input means displays a center mark, which is located at the center of the cutout frame for specifying a core of a fingerprint in a fingerprint image on the tenprint card, to be superposed on the image.

In another preferred construction, the cutout information input means comprises:

means for displaying tenprint card images;

means for displaying a cutout frame and a center mark to be superposed on said tenprint card images; and means for determining positions of said cutout frame and said center mark.

In the preferred construction, the cutout information input means displays, in addition to said cutout frame, orthogonal axes to be superposed on the fingerprint image, which axes cross with each other at the center of the cutout frame and are parallel to the respective sides of the cutout frame to specify a core of a fingerprint in a fingerprint image on the tenprint card and the direction of the fingerprint image in the cutout frame.

Also, the cutout information input means comprises:

means for displaying tenprint card images;

means for rotatably displaying a cutout frame and orthogonal axes to be superposed on said tenprint card images;

means for determining locations of said cutout frame and a crossing point of said orthogonal axes; and means for determining directions of said cutout frame and said orthogonal axes.

According to another aspect of the invention, a fingerprint image cutout processing method for a tenprint card comprising the steps of:

inputting, on a card basis, image data of a tenprint card containing rolled fingerprints and plain fingerprints of ten fingers of each hand;

storing said image data of the tenprint card input;

displaying the tenprint card images and ten cutout frames for specifying a cutout range of a fingerprint image of each finger to be superposed with each other and accepting input of fingerprint cutout information on a finger basis; and cutting fingerprint image data of each finger out of the image data of the tenprint card stored based on the cutout information.

In the preferred construction, the step of inputting cutout information comprises the step of displaying said quadrangular cutout frame corresponding to the size of a fingerprint image of the tenprint card to be superposed on an arbitrary position in the tenprint card images.

In the preferred construction, the step of displaying said tenprint card images and said cutout frames to be superposed with each other comprises the steps of:

displaying tenprint card images;

displaying the cutout frame to be superposed on said tenprint card images; and determining the position of said cutout frame.

Also, the step of displaying said tenprint card images and said cutout frames to be superposed with each other comprises the steps of:

displaying tenprint card images;

displaying the cutout frame and a center mark to be superposed on said tenprint card images; and determining positions of said cutout frame and said center mark.

In the preferred construction, the step of displaying said tenprint card images and said cutout frames to be superposed with each other comprises the steps of:

displaying tenprint card images;

rotatably displaying the cutout frame and orthogonal axes to be superposed on said fingerprint card images;

determining locations of said cutout frame and a crossing point of said orthogonal axes; and determining directions of said cutout frame and said orthogonal axes.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

A preferred embodiment of the present invention will be described in detail with reference to the accompanying drawings.

Figure 1:
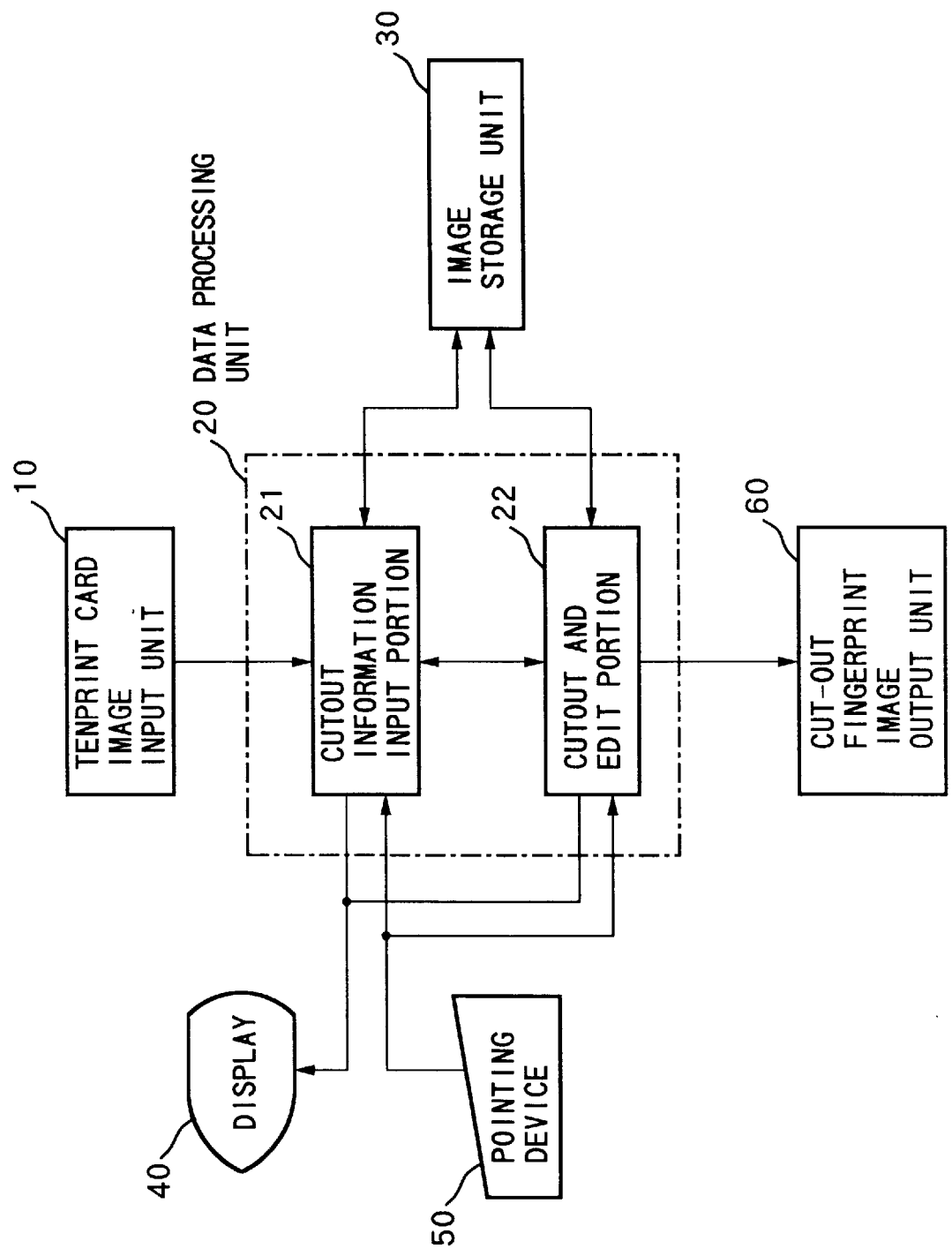
FIG. 1 is a block diagram showing an arrangement of a fingerprint image cutout processing device for a tenprint card according to one embodiment of the present invention.

FIG. 1 is a block diagram showing an arrangement of a fingerprint image cutout processing device for a tenprint card according to one embodiment of the present invention.

As shown in FIG. 1, a tenprint card reader of the present invention comprises a tenprint card image input unit 10 for inputting image data of a fingerprint, a data processing unit 20 operable under program control for conducting data processing of image data of a fingerprint, an image storage unit 30 for storing image data, a display 40 for displaying images, a pointing device 50 and a cut-out fingerprint image output unit 60 for outputting fingerprint image data.

The tenprint card image input unit 10, which is implemented by image input devices such as an image scanner, inputs image data of all the fingerprints printed on the tenprint card on a card basis card-by-card.

The data processing unit 20, which is implemented by, for example, CPUs of personal computers and workstations, comprises a cutout information input portion 21 for inputting information (cutout information) for use in cutting an image of each finger out of the input image data of the tenprint card, and a cutout and edit portion 22 for cutting out and editing fingerprint image data for each fingerprint out of the image data of the tenprint card based on the cutout information acquired by the cutout information input portion 21.

The cutout information input portion 21 stores the image data of the tenprint card (image data including all the fingerprints on the card) input through the tenprint card image input unit 10 in the image storage unit 30, as well as displaying the tenprint card image and ten cutout frames for specifying a cutout range for each fingerprint on the display 40. The cutout frame has a quadrangular shape and a fixed area.

An operator inputs fingerprint cutout information for each fingerprint by using the pointing device 50 while viewing the tenprint card image displayed on the display 40. Inputted cutout information specifies: a cutout area in a fingerprint image by using a cutout frame indicative of an area of image data corresponding to fingerprint a cutout area and a core position of a fingerprint by indicating the center position of the cutout frame and shifting the center position to meet the core of the fingerprint; and a cutout area, the core position of a fingerprint image and an inclination of the fingerprint image with respect to the cutout frame. The inclination of the fingerprint image is indicated by orthogonal axes crossing with each other at the center of the cutout frame. Designation of any fingerprint image based on the cutout information is possible within the area of the tenprint card images. It is therefore possible to adopt both rolled fingerprints and plain fingerprints as fingerprint image data.

Based on the cutout information applied from the cutout information input portion 21, the cutout and edit portion 22; cuts fingerprint image data for each fingerprint out of the image data of the tenprint card stored in the image storage unit 30; conducts predetermined editing processing of the cut-out data; and displays the edited data on the display 40.

The image storage unit 30, which is implemented by a work memory, a magnetic disk device, or an optical disk device, etc., stores the image data of the tenprint card sent from the cutout information input position 21 in the data processing unit 20 on a card basis.

The display 40 displays the input image of the tenprint card as edited by the cutout and edit portion 22. The pointing device 50, which is composed of an input device such as a mouse or a tablet, is used for the fingerprint-by-fingerprint input of cutout information for the tenprint card image displayed on the display 40. This display enables the operator to conduct verification of the results of the cutting process on the screen with reference to the image displayed on the display 40.

The cut-out fingerprint image output unit 60 outputs a fingerprint image for each fingerprint cut out by the data processing unit 20 and sends the image to a not-shown fingerprint collation unit in a fingerprint collation system.

Figure 6:
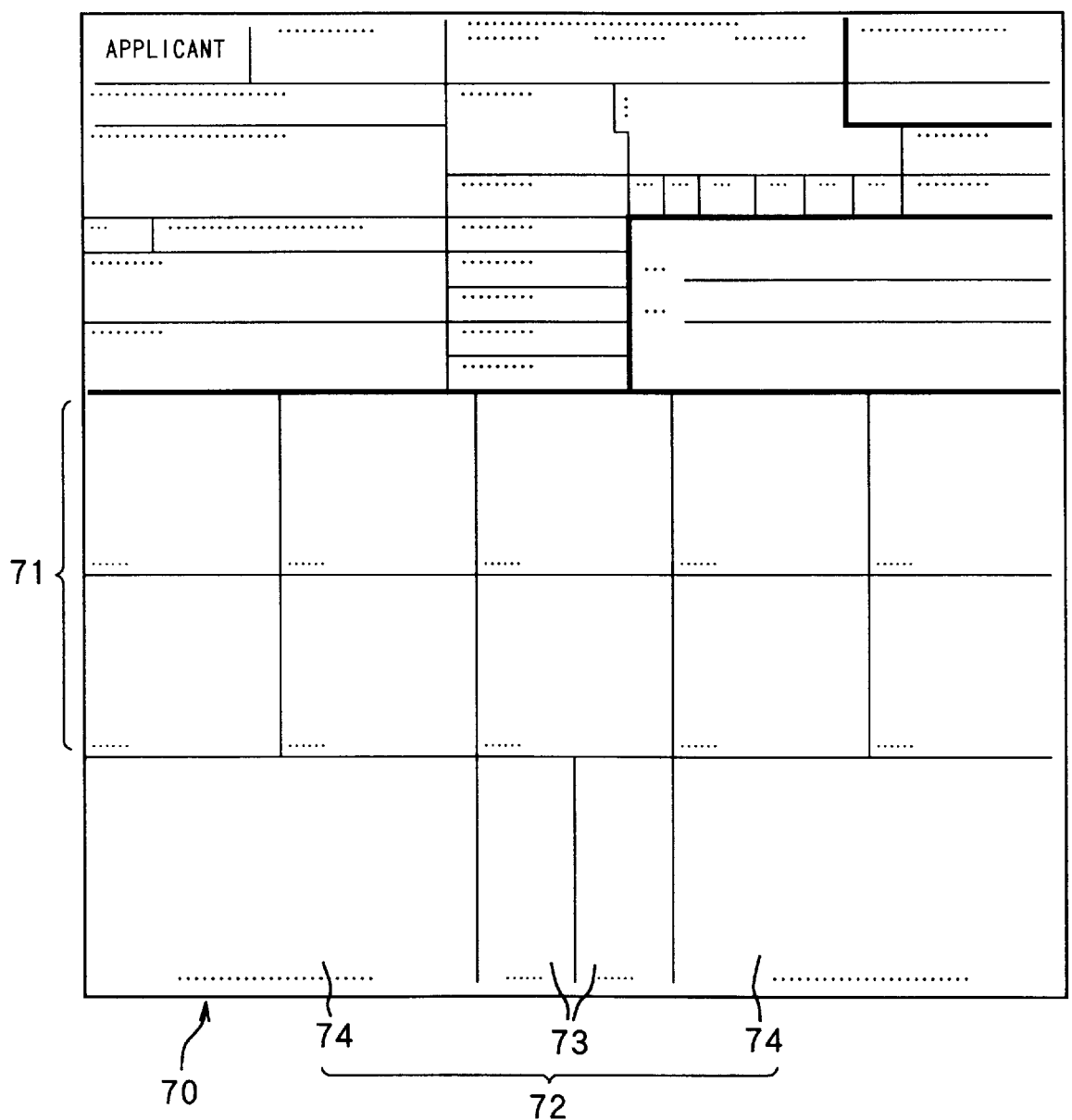
FIG. 6 is a diagram showing one example of a tenprint card.

A tenprint card 70 for containing fingerprints is such a card of approximately 20 centimeters square as shown in FIG. 6. The tenprint card 70 comprises a rolled fingerprint section 71, for the registration of rolled fingerprints of the respective fingers, and a plain fingerprint section 72 for the registration of plain fingerprints. The rolled fingerprint section 71 is made up of ten regions, for ten fingerprints each region having an area of some 4 centimeters square. In the figure, printed in the five regions in the upper row from left to right are rolled fingerprints of the thumb, the forefinger, the middle finger, the ring finger and the little finger of the right hand. In the five regions in the lower row from left to right are rolled fingerprints of the thumb, the forefinger, the middle finger, the ring finger and the little finger of the left hand. The plain fingerprint section 72 is made up of thumb regions 73, for the registration of a plain fingerprint of the thumb, and four-finger regions 74, for the registration of plain fingerprints of the four fingers, the forefinger, the middle finger, the ring finger and the little finger, all together.

In the figure, printed in the left-side thumb region 73 and four-finger region 74 are plain fingerprints of the left hand fingers and in the right-side thumb region 73 and four-finger region 74 are plain fingerprints of the right hand fingers. The tenprint card can contain twenty fingerprints corresponding to ten fingers in the above respective regions.

Figure 2:
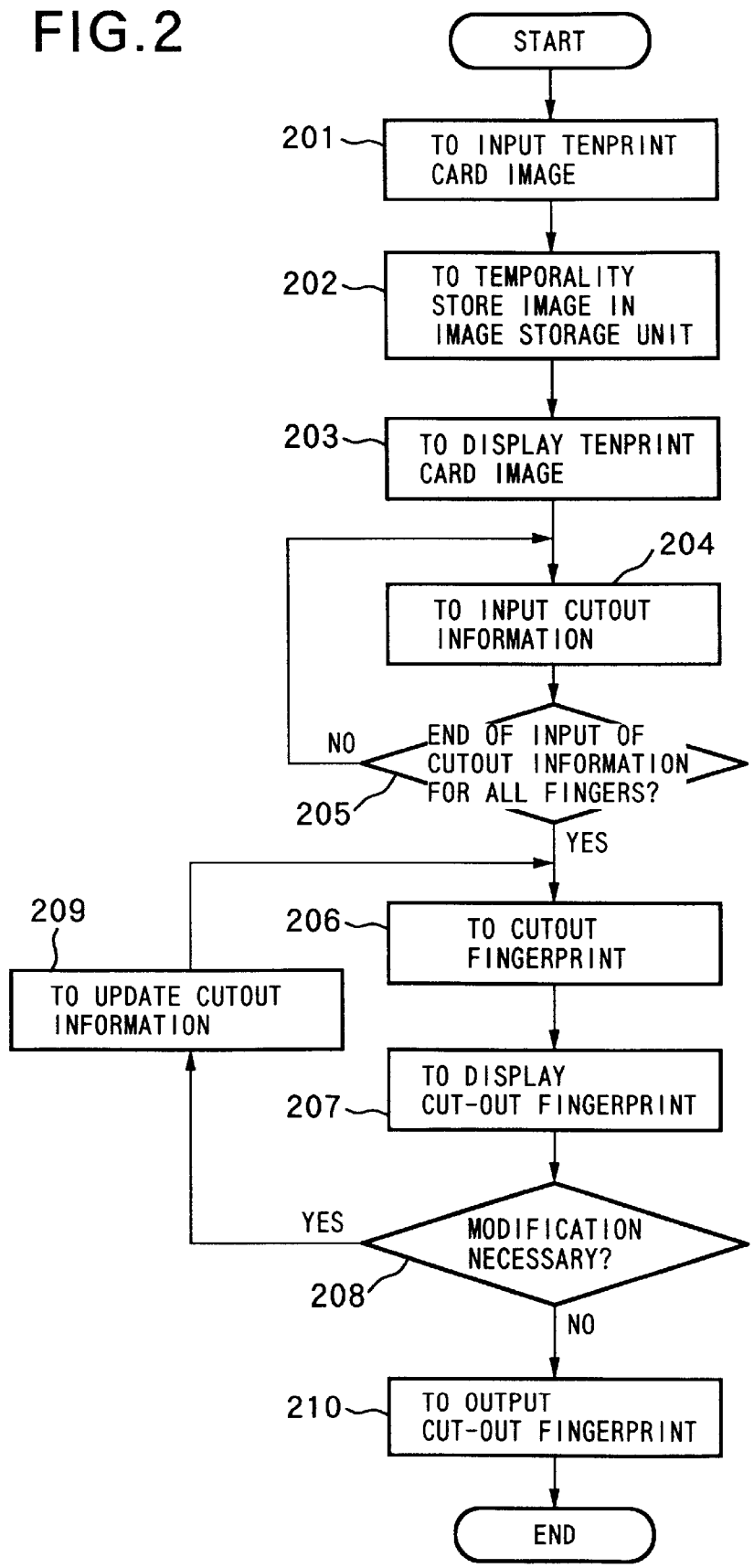
FIG. 2 is a flow chart illustrating operation of the present embodiment.

FIG. 2 is a flow chart illustrating one example of operation of the present embodiment. Following FIG. 2, the operation of the present embodiment will be described with reference to FIG. 1.

Figure 7:
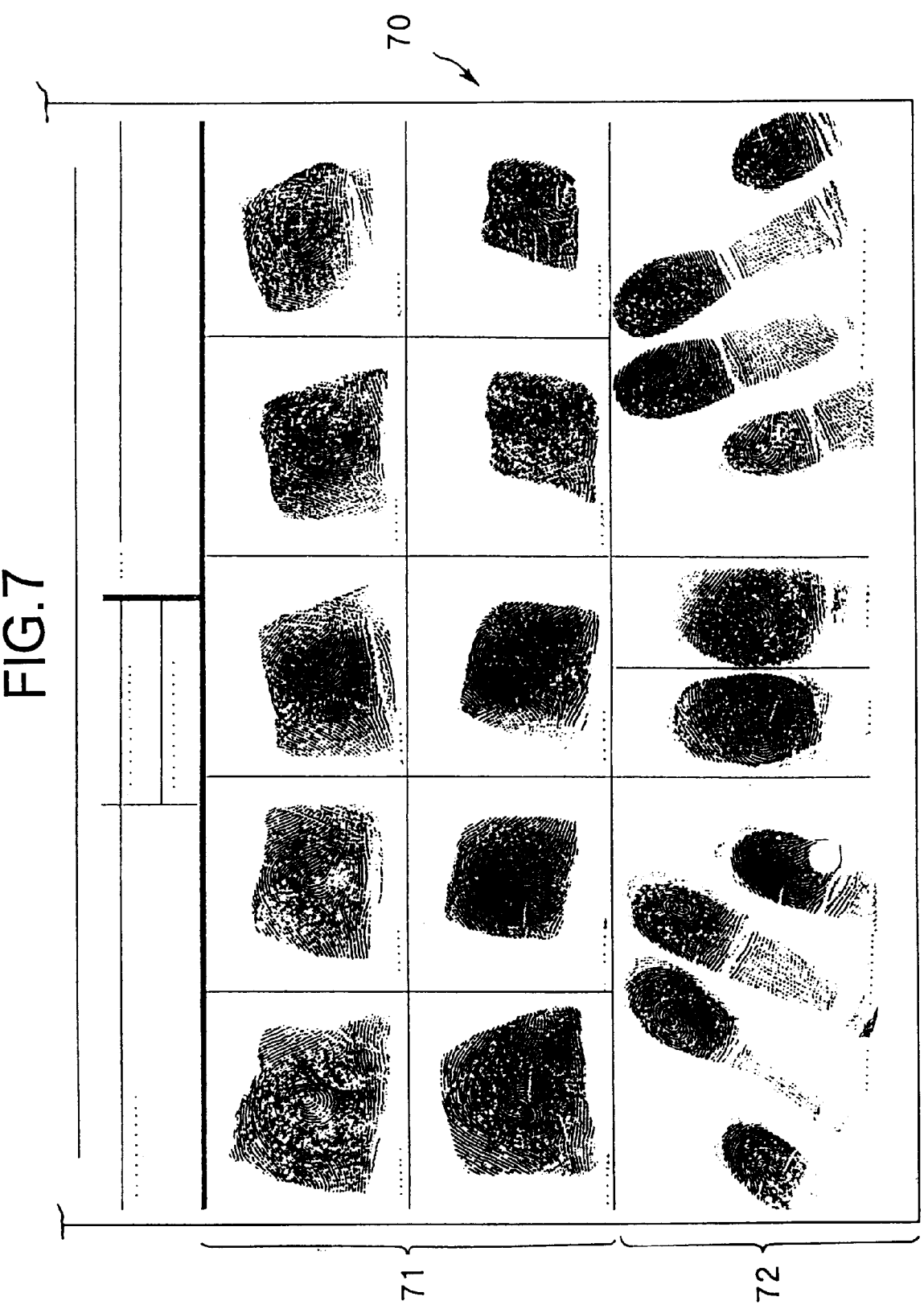
FIG. 7 is a diagram showing a display example of tenprint card images according to the present embodiment.

Image data of the tenprint card 70 input through the tenprint card image input unit 10 is applied to the cutout information input portion 21 (Step 201). The cutout information input portion 21 stores the received image data of the tenprint card 70 in the image storage unit 30 (Step 202) while displaying the tenprint card images input to the display 40 and ten cutout frames for specifying a cutout range of a fingerprint image of each finger by superposing the images and frames with each other (Step 203). FIG. 7 shows an example of a card-by-card display of tenprint card images, which displays all the fingerprints printed in the rolled fingerprint section 71 and the plain fingerprint section 72 of the tenprint card 70 shown in FIG. 6. On the display 40, these images are displayed with ten cutout frames superposed thereon.

Then, the cutout information input portion 21 accepts fingerprint cutout information for each fingerprint input by the operator by using the pointing device 50 (Step 204).

A method of inputting cutout information will be described in the following with reference to the flow charts shown in FIG. 3 through FIG. 5 and FIG. 8 through FIG. 10.

Figure 3:
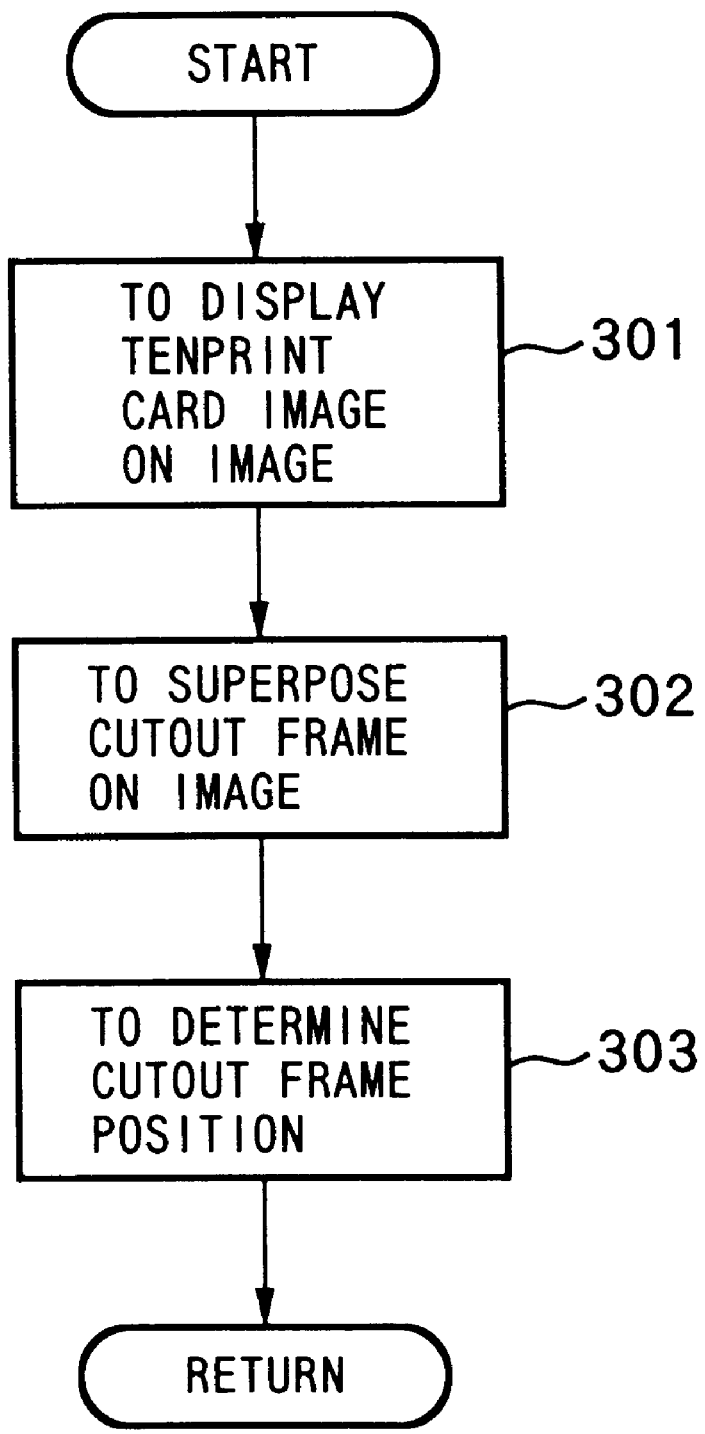
FIG. 3 is a flow chart illustrating operation of a cutout information input portion of the present embodiment, which operation corresponds to a first cutout information input mode.
Figure 8:
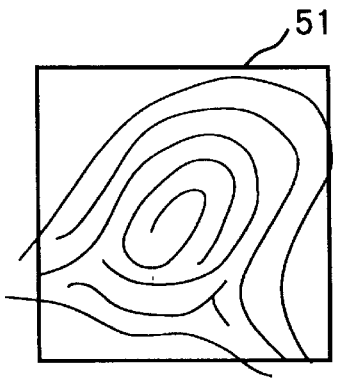
FIG. 8 is a diagram showing the first cutout information input mode according to the present embodiment.

A first cutout information input mode is to display a cutout frame 51 on the display screen of the display 40 to determine an optimum cutout range (see FIGS. 3 and 8).

In FIG. 3 showing the first input mode, the cutout information input portion 21 first displays a tenprint card image on the display 40 (Step 301). Then, the cutout frame 51 for specifying a cutout range of a fingerprint image is superposed on the image shown in FIG. 8 (Step 302). The operator then shifts the cutout frame 51 by using the pointing device 50 to determine a position (cutout range) of the cutout frame 51 (Step 303).

Although a core of a fingerprint is crucial for collation of fingerprints and detection of a core position of a fingerprint in a cut-out fingerprint image is therefore necessary, the fingerprint core position is not used in this mode as cutout information. The mode employs a technique for automatically seeking a core of a fingerprint from a fingerprint image. Concerning this technique, U.S. Pat. No. 5,040,224 is herein incorporated by reference.

Figure 4:
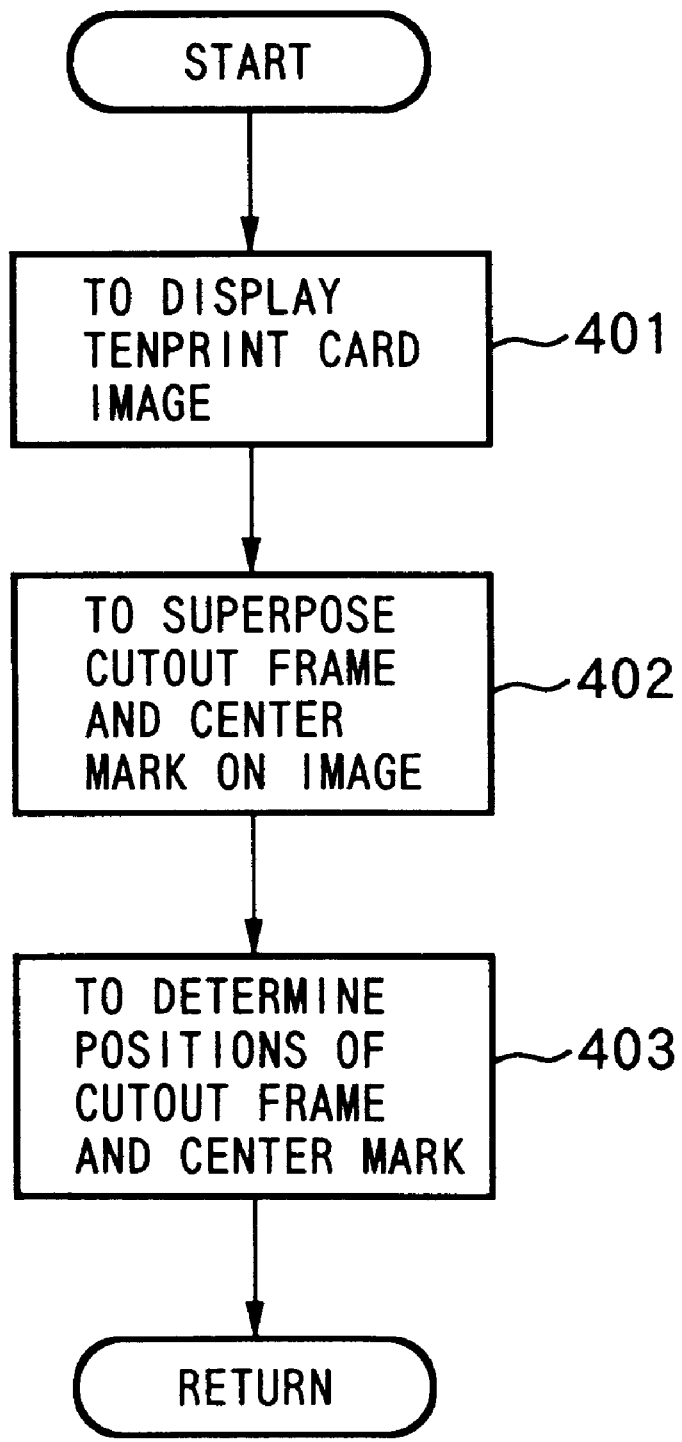
FIG. 4 is a flow chart illustrating operation of the cutout information input portion of the present embodiment, which operation corresponds to a second cutout information input mode.
Figure 9:
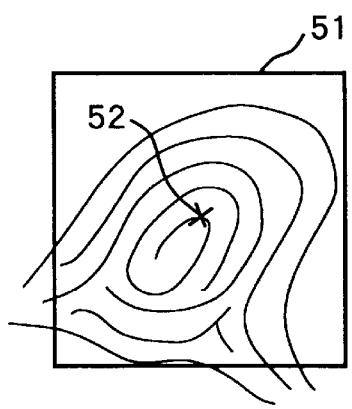
FIG. 9 is a diagram showing the second cutout information input mode according to the present embodiment.

A second cutout information input mode displays the cutout frame 51 and a center mark 52 located at the center of the cutout frame 51 to specify a core of the fingerprint image on the display screen of the display 41 to determine an optimum cutout range (see FIGS. 4 and 9).

In FIG. 4 showing the second input mode, the cutout information input portion 21 first displays a tenprint card image on the display (Step 401). Then, being superposed with each other, the cutout frame 51 for specifying a cutout range of a fingerprint image and the center mark 52 for specifying a core of the fingerprint are displayed as shown in FIG. 9 (Step 402). The operator then shifts the cutout frame 51 by the pointing device 50 to determine a position (cutout range) of the cutout frame 51. At the same time, the operator moves the center mark 52 to meet the core of the fingerprint to specify the fingerprint core position in addition to the cutout range (Step 403).

The above-described automatic fingerprint core detection technique requires the operator's verification of a result of detection and modification processes when necessary. According to this mode, the operator's accurate designation of a core of a fingerprint at the time of inputting information can eliminate the need for the automatic detection of the fingerprint core and the operator's verification and modification of automatic detection results. This accurate designation thereby reduces time for inputting fingerprint information. In addition, since the center of a cutout range will fall on a fingerprint core and fingerprint images will accordingly have the same height, this input mode facilitates comparison of a plurality of displayed cut-out fingerprint images.

Figure 5:
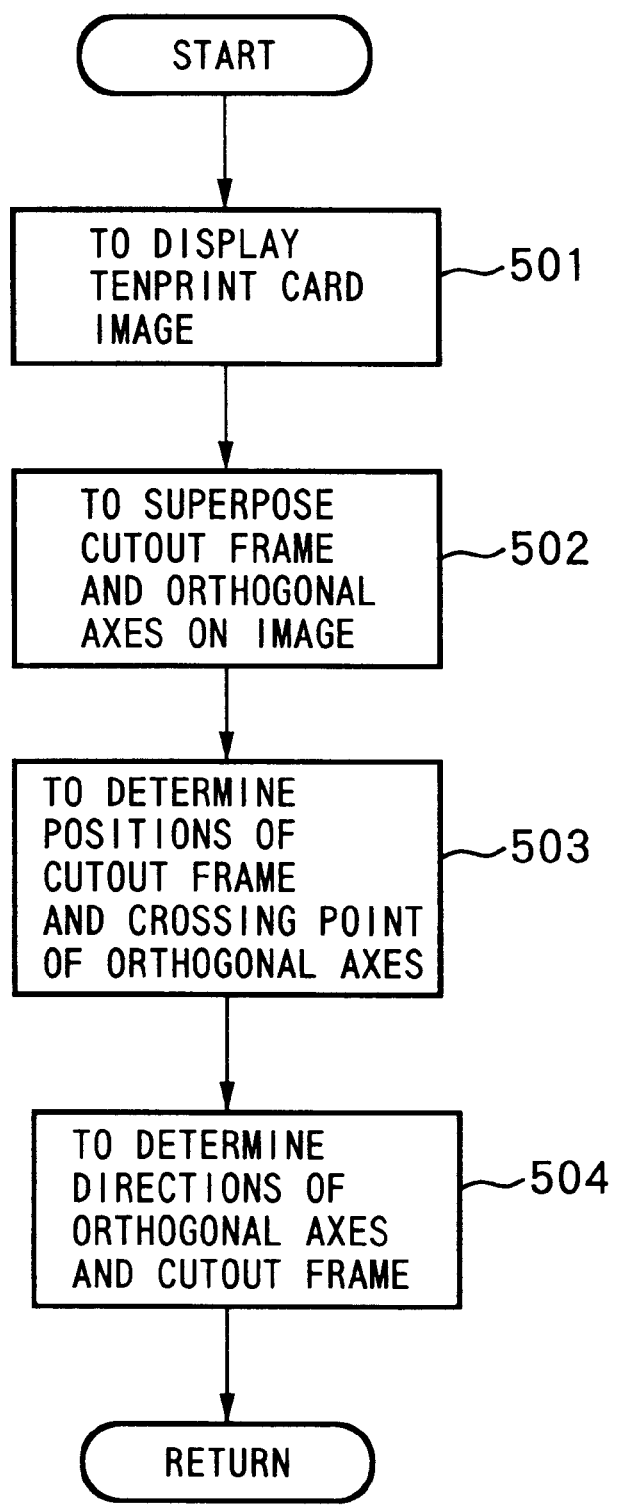
FIG. 5 is a flow chart illustrating operation of the cutout information input portion of the present embodiment, which operation corresponds to a third cutout information input mode.
Figure 10:
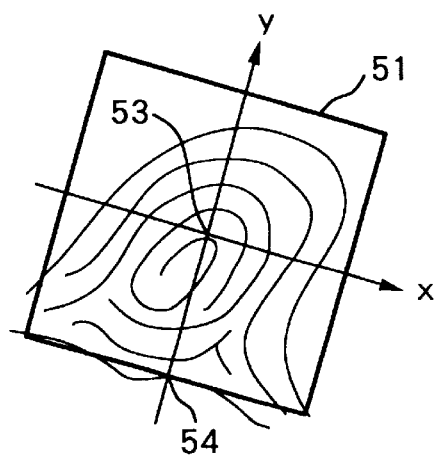
FIG. 10 is a diagram showing the third cutout information input mode according to the present embodiment.

A third cutout information input mode is to display, on the display screen of the display 40, the cutout frame 51 and orthogonal axes crossing with each other at the center of the cutout frame 51 and being parallel to the respective sides of the cutout frame 51 to determine optimum cutout range and direction (see FIGS. 5 and 10).

In FIG. 5 showing the third input mode, the cutout information input portion 21 first displays a tenprint card image on the display 40 (Step 501). Then, being superposed with each other, the cutout frame 51 (for specifying a cutout range of a fingerprint image) and the orthogonal axes (for specifying a core of the fingerprint and the direction of the fingerprint image) are displaced as shown in FIG. 10 (Step 502). The operator then shifts the cutout frame 51 by using the pointing device 51 to determine a position (cutout range) of the cutout frame 51 (Step 503). At the same time, the operator moves a crossing point 53 of the orthogonal axes to meet the core of the fingerprint, thereby specifying the fingerprint core position in addition to the cutout range (Step 503). Then, the operator designates a shift destination after pointing at a crossing point 54 between the y axis, provided as a rotation handle of the cutout frame 51, and the cutout frame 51, by a cursor to turn around the orthogonal axes and the cutout frame 51 to determine an inclination of the fingerprint image within the cutout frame 51 (Step 504).

Since in this method not only a core of a fingerprint but also a direction of a fingertip of a fingerprint image can be fixed to make a core of each fingerprint have the same height and each image have the same direction, comparison of a plurality of displayed cut-out fingerprint images is much easier. The manner of turning the cutout frame 51 is not limited to that described above. For example, the cursor may be moved until the cutout frame 51 has a desired direction after pointing at the crossing point 53 of the y axis and the cutout frame 51.

Input of the cutout information according to the above methods will be repeated as many times as the number of necessary fingerprints (corresponding to 10 fingers in general)(Step 205). The cutout frame 51 displayed on the screen is designed to be able to distinguish between unfinished designation and finished designation. For example, a broken line and a solid line are used for unfinished designation and finished designation, respectively.

Figure 11:
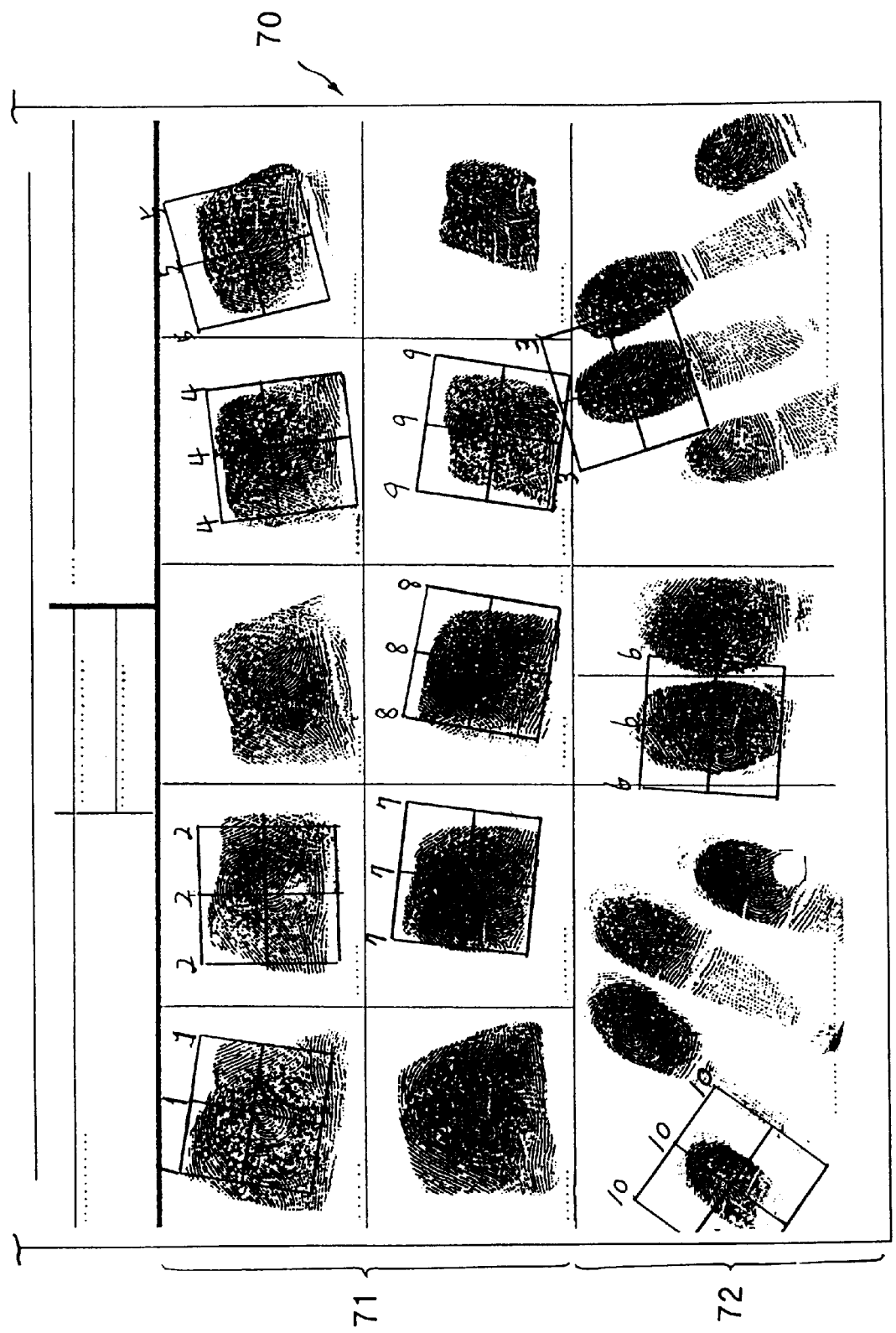
FIG. 11 is a diagram showing a display example of tenprint card images with cutout information applied thereto according to the present invention.

FIG. 11 shows an example of screen display on the display 40, where cutout information has been already input according the above-described cutout range and direction designation mode (see FIGS. 5 and 10). In FIG. 11, the cutout frames 51 for fingerprint corresponding to ten fingers are displayed to be superposed on the tenprint card images of each card shown in FIG. 7. A numeral at the top of each cutout frame 51 denotes a finger number. Finger numbers 1 to 5 denote the thumb, the forefinger, the middle finger, the ring finger, and the little finger of the right hand, respectively, and the numbers 6 to 10 denote the thumb, the forefinger, the middle finger, the ring finger and the little finger of the left hand, respectively. According to the present embodiment, it is possible to cut out, in place of a rolled fingerprint of poor quality, a corresponding plain fingerprint of high quality. In the example shown in the figure, plain fingerprints, instead of rolled fingerprints, are cut out of the three sections corresponding to the fingers denoted by the finger numbers 3, 6 and 10.

Figure 12:
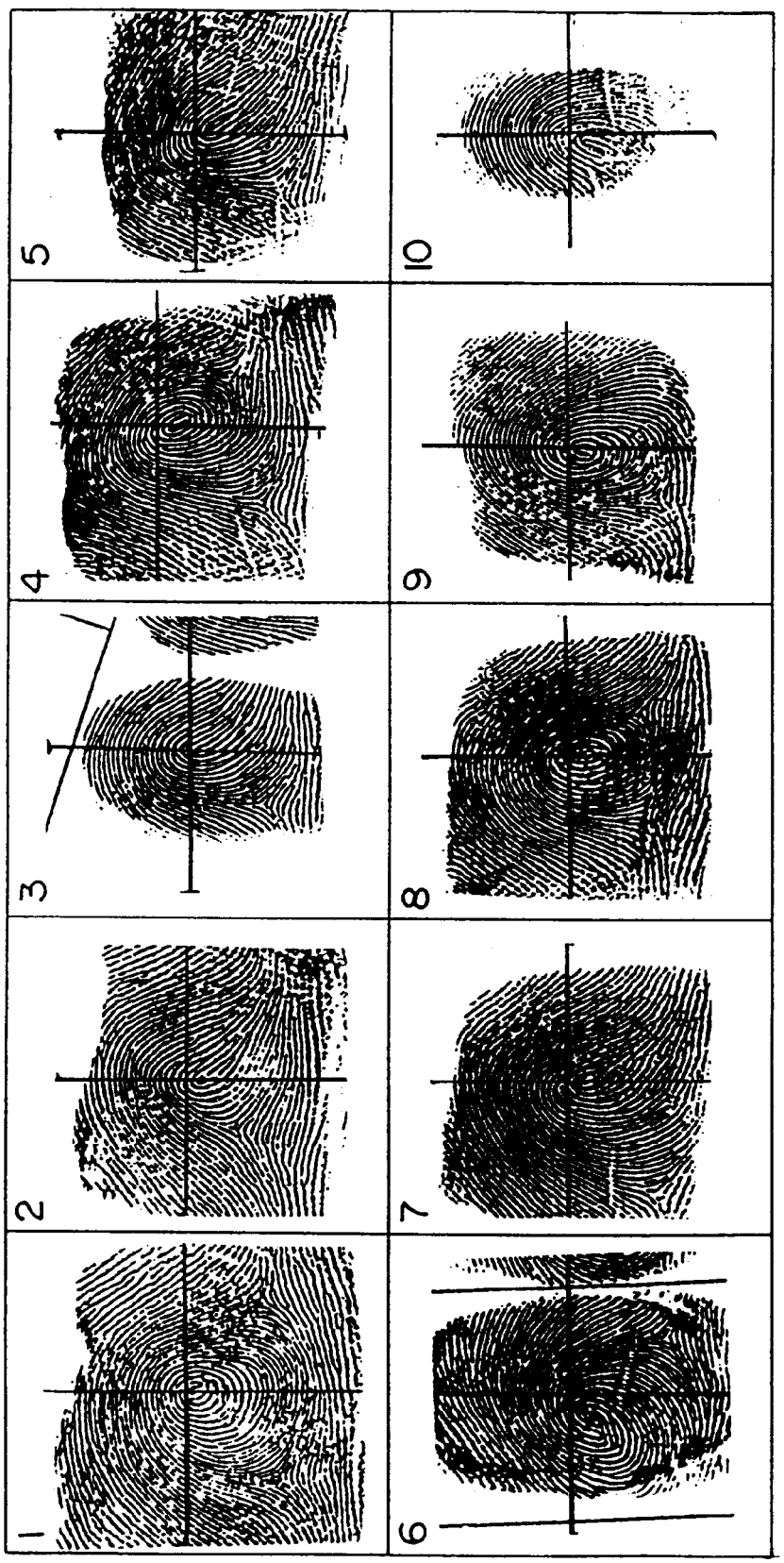
FIG. 12 is a diagram showing a display example of a result of edit according to the present embodiment.

Then, the cutout information for each finger acquired by the cutout information input portion 21 is given to the cutout and edit portion 22. The cutout and edit portion 22 sequentially cuts fingerprint image data of each fingerprint out of the tenprint card image data of each card stored in the image storage unit 30 based on the cutout information, edits fingerprint image data as many as the number of necessary fingers (Step 206) and displays the edited data on the display 40 (Step 207). FIG. 12 shows one example of screen display of the results of edit by the cutout and edit portion 22 on the display 40.

In the figure, numbers 1 to 10 allotted to the respective regions where fingerprint images are displayed are finger numbers corresponding to those allotted to the cutout frames 51 in FIG. 11. In FIG. 12, displayed in the upper row are fingerprints of the right hand thumb through little finger and displayed in the lower row are fingerprints of the left hand thumb through little finger in order.

Next, the operator verifies the fingerprint image displayed on the display 40, inputs another cutout information through the cutout information input portion 21 when modification is necessary (Steps 208 and 209), returns to Step 206 to cut out the fingerprint image based on the modified cutout information and again displays the cut-out image on the display 40. When no modification is necessary, the cut-out fingerprint image data of each finger is applied to the fingerprint image output unit 60 and output therefrom (Step 210).

Although in the respective embodiments set forth above, the cutout of fingerprint images is done by using a square-shaped cutout frame, the cutout frame is not limited to be quadrangular in shape but may have other shapes such as circle and oval.

As described in the foregoing, in the tenprint card reader according to the present invention, tenprint card images of each card are displayed on the display and fingerprint cutout information for each fingerprint is input by the operator's operation on the screen to cut fingerprint image data of each finger out of the tenprint card image data of each card based on the input cutout information. It is therefore possible to cut out an optimum fingerprint image position with ease. Another advantage is that because the device of the present embodiment allows both a rolled fingerprint and a plain fingerprint to be used for a fingerprint image adopted as fingerprint image data, fingerprint images of good quality can be input to improve collation accuracy of a fingerprint collation system.

In addition, by designating a core of a fingerprint as well as a cutout position, the device of the present embodiment eliminates the need for automatic fingerprint core detection processing and verification of detection results, thereby reducing time and the number of processes necessary for the input of fingerprint information. Furthermore, the device's capability of making a fingerprint core position meet the center of a cutout position facilitates collation of fingerprints. The device further facilitates collation of fingerprints by designating a cutout position and a cutout direction to cut out even fingerprints printed aslant with their and aligned with each other.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A fingerprint image cutout processing device for a tenprint card comprising:
    image input means for inputting, on a card-by-card basis, image data provided on a tenprint card containing rolled fingerprints and plain fingerprints of ten fingers;
    image storage means for storing said image data input by said image input means;
    cutout information input means for accepting input of fingerprint cutout information for each of said ten fingers, said cutout information input means displaying said tenprint image data and ten cutout frames in order to specify a cutout area of each fingerprint image to be superposed with each other; and
    cutout means for cutting, on a finger-by-finger basis, fingerprint image data out of the tenprint image data of the tenprint card stored in said image storage means based on the tenprint cutout information input to said cutout information input means.

2. The fingerprint image cutout processing device for a tenprint card as set forth in claim 1, further comprising display means for displaying fingerprint images, wherein said cutout means displays the fingerprint image data cut out on a finger-by-finger basis, in a predetermined order on a screen of said display means.

3. The fingerprint image cutout processing device for a tenprint card of claim 2 wherein, the cutout information input means is capable of receiving modified cutout information corresponding to additional fingerprint images of each of said ten fingers contained on said tenprint card.

4. The fingerprint image cutout processing device for a tenprint card as set forth in claim 1, wherein said cutout information input means displays each of said cutout frames as a quadrangular shape, said quadrangular shape corresponding to the size of each of the said fingerprint images.

5. The fingerprint image cutout processing device for a tenprint card of claim 4 wherein, the cutout information input means is capable of receiving modified cutout information corresponding to additional fingerprint images of each of said ten fingers contained on said tenprint card.

6. The fingerprint image cutout processing device for a tenprint card as set forth in claim 1, wherein said cutout information input means comprises:
    means for displaying tenprint card images;
    means for displaying a cutout frame to be superposed on said tenprint card images; and
    means for determining a position of said cutout frame.

7. The fingerprint image cutout processing device for a tenprint card of claim 6 wherein, the cutout information input means is capable of receiving modified cutout information corresponding to additional fingerprint images of each of said ten fingers contained on said tenprint card.

8. The fingerprint image cutout processing device for a tenprint card as set forth in claim 1, wherein said cutout information input means displays, in addition to said each of said cutout frames, ten center marks one of said center marks located at the center of each of said cutout frames to specify a core of a fingerprint image on the tenprint card.

9. The fingerprint image cutout processing device for a tenprint card of claim 8 wherein, the cutout information input means is capable of receiving modified cutout information corresponding to additional fingerprint images of each of said ten fingers contained on said tenprint card.

10. The fingerprint image cutout processing device for a tenprint card as set forth in claim 1, wherein said cutout information input means comprises:

means for displaying tenprint card images;

means for displaying a cutout frame and a center mark to be superposed on said tenprint card images; and means for determining positions of said cutout frame and said center mark.

11. The fingerprint image cutout processing device for a tenprint card of claim 10 wherein, the cutout information input means is capable of receiving modified cutout information corresponding to additional fingerprint images of each of said ten fingers contained on said tenprint card.

12. The fingerprint image cutout processing device for a tenprint card as set forth in claim 1, wherein said cutout information input means displays, in addition to said cutout frame, orthogonal axes to be superposed on the fingerprint image, said axes crossing each other at the center of the cutout frame, each of said axes being parallel with the respective sides of the cutout frame, to specify a core of a fingerprint image on the tenprint card and the direction of the fingerprint image in the cutout frame.

13. The fingerprint image cutout processing device for a tenprint card of claim 12 wherein, the cutout information input means is capable of receiving modified cutout information corresponding to additional fingerprint images of each of said ten fingers contained on said tenprint card.

14. The fingerprint image cutout processing device for a tenprint card as set forth in claim 1, wherein said cutout information input means comprises:

means for displaying said tenprint image data;

means for rotatably displaying said ten cutout frames and orthogonal axes to be superposed on said tenprint card images;

means for determining locations of said cutout frame and a crossing point of said orthogonal axes; and means for determining directions of said cutout frame and said orthogonal axes.

15. The fingerprint image cutout processing device for a tenprint card of claim 14 wherein, the cutout information input means is capable of receiving modified cutout information corresponding to additional fingerprint images of each of said ten fingers contained on said tenprint card.

16. The fingerprint image cutout processing device for a tenprint card of claim 1 wherein, the cutout information input means is capable of receiving modified cutout information corresponding to additional fingerprint images of each of said ten fingers contained on said tenprint card.

17. A fingerprint image cutout processing method for a tenprint card comprising the steps of:

inputting, on a card-by-card basis, image data of a tenprint card containing rolled fingerprints and plain fingerprints of ten fingers;

storing said image data of the tenprint card input;

displaying said tenprint image data and ten cutout frames in order to specify a cutout area of a fingerprint image to be superposed with each other;

accepting input of fingerprint cutout information on a finger-by-finger basis; and cutting out fingerprint image data for each of the ten fingers from the image data of the tenprint card stored based on the cutout information.

18. The fingerprint image cutout processing method for a tenprint card as set forth in claim 17, wherein said step of displaying said tenprint image data and ten cutout frames comprises the step of displaying each of said cutout frames as a quadrangular shape corresponding to the size of the fingerprint image of the tenprint card to be superposed on an arbitrary position in the tenprint card images.

19. The fingerprint image cutout processing method for a tenprint card of claim 18 wherein, following the step of cutting out fingerprint image data, the method further comprising the additional step of:

modifying, if necessary, the cutout information to correspond to a fingerprint image other than the fingerprint image located by the first cutout information.

20. The fingerprint image cutout processing method for a tenprint card as set forth in claim 17, wherein said step of displaying said tenprint card image data and said ten cutout frames to be superposed with each other comprises the steps of:

displaying tenprint card image data;

displaying the cutout frames to be superposed on said tenprint card images; and determining the position of said cutout frame.

21. The fingerprint image cutout processing method for a tenprint card of claim 20, wherein, following the step of cutting out fingerprint image data, the method further comprising the additional step of:

modifying, if necessary, the cutout information to correspond to a fingerprint image other than the fingerprint image located by the first cutout information.

22. The fingerprint image cutout processing method for a tenprint card as set forth in claim 17, wherein said step of displaying said tenprint card image data and said ten cutout frames to be superposed with each other comprises the steps of:

displaying tenprint card image data;

displaying the cutout frames and a center mark to be superposed on each of said images of said tenprint image data; and determining positions of said cutout frames and said center marks.

23. The fingerprint image cutout processing method for a tenprint card of claim 22, wherein, following the step of cutting out fingerprint image data, the method further comprising the additional step of:

modifying, if necessary, the cutout information to correspond to a fingerprint image other than the fingerprint image located by the first cutout information.

24. The fingerprint image cutout processing method for a tenprint card as set forth in claim 17, wherein said step of displaying said tenprint card image data and said ten cutout frames to be superposed with each other comprises the steps of:

displaying tenprint image data;

rotatably displaying the cutout frame and orthogonal axes to be superposed on each image of said tenprint image data;

determining locations of said cutout frames and a crossing point of each of said orthogonal axes; and determining directions of said cutout frames and said orthogonal axes.

25. The fingerprint image cutout processing method for a tenprint card of claim 24, wherein, following the step of cutting out fingerprint image data, the method further comprising the additional step of:

modifying, if necessary, the cutout information to correspond to a fingerprint image other than the fingerprint image located by the first cutout information.

26. The fingerprint image cutout processing method for a tenprint card of claim 17, wherein, following the step of cutting out fingerprint image data, the method further comprising the additional step of:

modifying, if necessary, the cutout information to correspond to a fingerprint image other than the fingerprint image located by the first cutout information.

* * * * *